United States Patent
Page

(10) Patent No.: US 12,263,664 B2
(45) Date of Patent: Apr. 1, 2025

(54) AIRCRAFT WITH COMPOSITE ASSEMBLY AND A METHOD OF MANUFACTURE

(71) Applicant: JETZERO, INC., Long Beach, CA (US)

(72) Inventor: Mark Allan Page, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/118,827

(22) Filed: Mar. 8, 2023

(65) Prior Publication Data
US 2024/0300209 A1    Sep. 12, 2024

(51) Int. Cl.
| | |
|---|---|
| B32B 5/12 | (2006.01) |
| B32B 5/02 | (2006.01) |
| B32B 5/06 | (2006.01) |
| B32B 5/26 | (2006.01) |
| B32B 37/15 | (2006.01) |

(Continued)

(52) U.S. Cl.
CPC .............. *B32B 5/073* (2021.05); *B32B 5/024* (2013.01); *B32B 5/26* (2013.01); *B32B 37/15* (2013.01); *B64C 1/12* (2013.01); *B64C 39/00* (2013.01); *B64F 5/10* (2017.01); *B32B 2250/20* (2013.01); *B32B 2255/02* (2013.01); *B32B 2260/023* (2013.01); *B32B 2260/046* (2013.01); *B32B 2262/106* (2013.01); *B32B 2305/10* (2013.01);

(Continued)

(58) Field of Classification Search
CPC ......... B32B 5/26; B32B 5/12; B32B 2255/02; B32B 2260/023; B32B 2260/046; B32B 2262/106; B32B 2305/10; B32B 2605/18; B64C 2039/105
See application file for complete search history.

(56) References Cited

U.S. PATENT DOCUMENTS

| | | | |
|---|---|---|---|
| 4,198,018 A | * | 4/1980 | Brault ................ B29D 99/0003 428/116 |
| 5,902,535 A | | 5/1999 | Burgess |

(Continued)

OTHER PUBLICATIONS

Mahmoud R. Abusrea, Seung-Wook Han, Kazuo Arakawa, Nak-Sam Choi; Bending strength of CFRP laminated adhesive joints fabricated by vacuum-assisted resin transfer molding; Jan. 1, 2019; Composites Part B: Engineering,vol. 156; p. 8-16; https://www.sciencedirect.com/science/article/abs/pii/S1359836818309417.

(Continued)

*Primary Examiner* — Joanna Pleszczynska
(74) *Attorney, Agent, or Firm* — Caldwell Intellectual Property Law

(57) ABSTRACT

A composite assembly for a blended wing body aircraft, the composite assembly comprising: a first assembly comprising a first molded part, wherein the first molded part comprises a first plurality of fibers, the first molded part partially infused with a first resin, a second assembly oriented relative to the first assembly, the second assembly comprising a second molded part wherein the second molded part comprises a second plurality of fibers, the second molded part partially infused with a second resin, and a joining region, the joining region comprising at least a portion of first plurality of fibers and at least a portion of second plurality of fibers, the at least a portion of first plurality of fibers and the at least a portion of second plurality of fibers substantially adjacent and infused with a third resin.

9 Claims, 5 Drawing Sheets

(51) Int. Cl.
  *B64C 1/12* (2006.01)
  *B64C 39/00* (2023.01)
  *B64F 5/10* (2017.01)
  *B64C 39/10* (2006.01)

(52) U.S. Cl.
  CPC ....... *B32B 2313/04* (2013.01); *B32B 2605/18* (2013.01); *B64C 2039/105* (2013.01)

(56) References Cited

U.S. PATENT DOCUMENTS

| | | |
|---|---|---|
| 6,896,841 B2 | 5/2005 | Velicki |
| 2009/0136734 A1* | 5/2009 | Berkel .................... B32B 5/024 428/292.1 |
| 2018/0169930 A1* | 6/2018 | Tsotsis ................. B29C 53/582 |
| 2020/0247071 A1* | 8/2020 | Adachi ................. B29C 70/202 |
| 2021/0309819 A1* | 10/2021 | Yamane .................. C08J 5/249 |
| 2022/0258853 A1* | 8/2022 | Linde ...................... F03G 7/005 |

OTHER PUBLICATIONS

Alex Velicki, Patrick Thrash; Advanced Structural Concept Development Using Stitched Composites; Apr. 7, 2008; 49th AIAA/ASME/ASCE/AHS/ASC Structures, Structural Dynamics, and Materials Conference; 'https://arc.alaa.org/doi/pdf/10.2514/6.2008-2329.

* cited by examiner

AIRCRAFT WITH COMPOSITE ASSEMBLY AND A METHOD OF MANUFACTURE

FIELD OF THE INVENTION

The present invention generally relates to the field of aircraft structures. In particular, the present invention is directed to composite assemblies for blended wing body aircraft.

BACKGROUND

Conventional aircraft typically contain an outer surface made of aluminum or an aluminum mixture. Conventional aircraft typically do not utilize composites for the outer surface of the aircraft due to issues with delamination and issues with binding composites together.

SUMMARY OF THE DISCLOSURE

In an aspect a composite assembly for a blended wing body aircraft is illustrated. The composite assembly includes a first assembly comprising a first molded part, wherein the first molded part comprises a first plurality of fibers, the first molded part partially infused with a first resin. The composite assembly further includes a second assembly oriented relative to the first assembly, the second assembly including a second molded part wherein the second molded part includes a second plurality of fibers, the second molded part partially infused with a second resin. The composite assembly further includes a joining region, the joining region having at least a portion of first plurality of fibers and at least a portion of second plurality of fibers, the at least a portion of first plurality of fibers and the at least a portion of second plurality of fibers substantially adjacent and infused with a third resin.

In another aspect, a method of manufacturing a composite assembly for a blended wing body aircraft is illustrated. The Method includes forming a first assembly having a first plurality of fibers, wherein forming the first assembly includes molding a first molded part, wherein molding the first molded part comprises partially infusing a resin into a first mold. The method further includes forming a second assembly having a second plurality of fibers, wherein forming the second assembly includes molding a second molded part, wherein molding the second molded part comprises partially infusing a resin into a second mold. The method further includes orienting the second assembly relative to the first assembly to create a joining region, wherein the joining region includes a first uninfused region of the first assembly and a second uninfused region of the second assembly. The method further includes molding the joining region, wherein molding the joining region includes infusing the first uninfused region and the second uninfused region with the resin and curing the joining region to create a composite assembly.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a composite assembly for a blended wing body aircraft to allow for a single unified structure. In an embodiment, composite assembly may include a joining region wherein the joining region is configured to attach a plurality of composites and create a single unified structure.

Aspects of the present disclosure can be used to create a single unified structure that minimizes delimitation and tearing in airplane structures. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 3. Furthermore, there is no intention to be bound by any expressed or implied theory presented in this disclosure.

Figure 1:
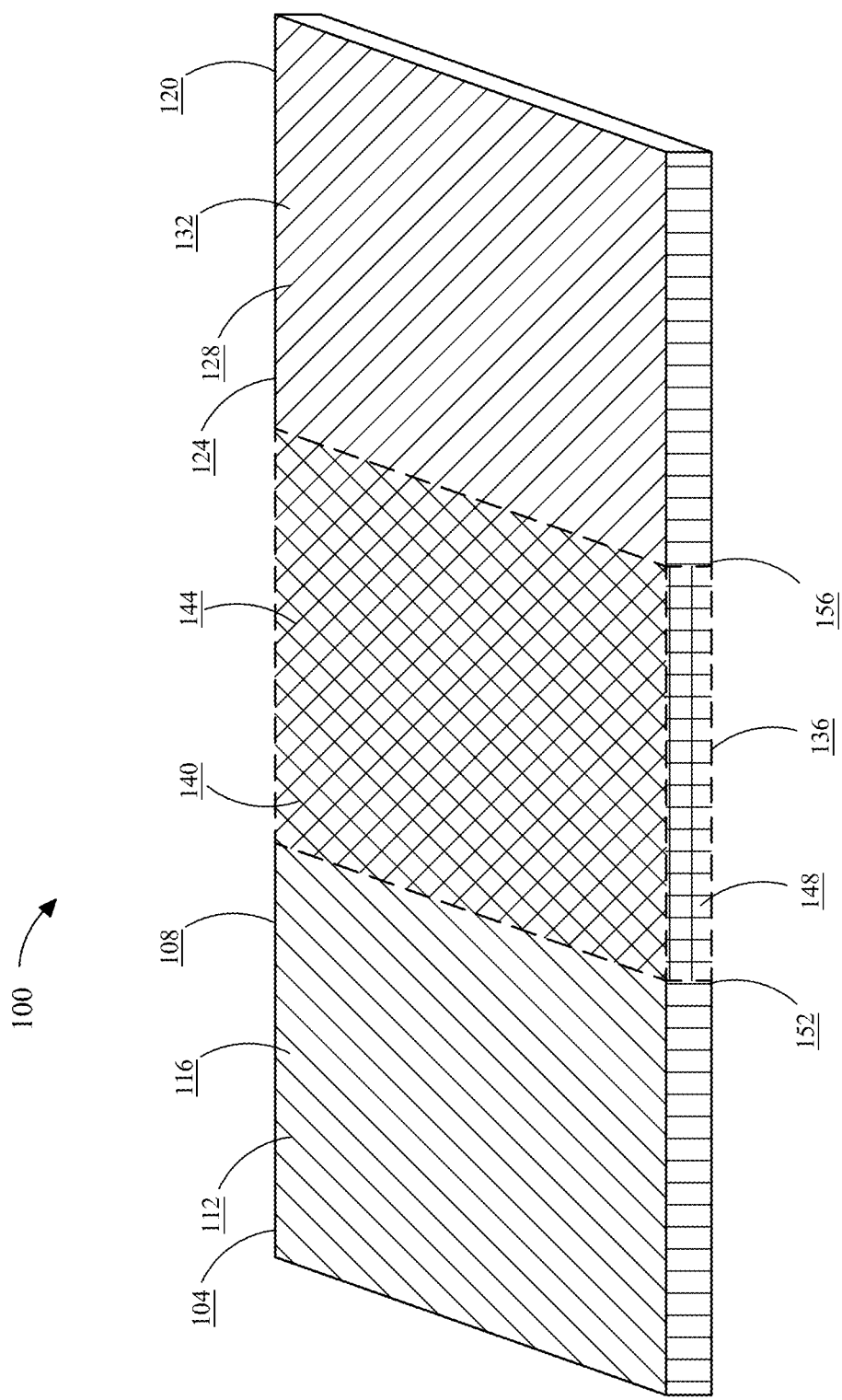
FIG. 1 is an isometric view of an exemplary embodiment of a composite assembly according to the subject disclosure.

Referring to FIG. 1, a composite assembly 100 for a blended wing body aircraft is illustrated. Composite assembly 100 includes a first assembly 104. First assembly 104 includes a first molded part 108, wherein first molded part 108 contains a first plurality of fibers 112 and is partially infused with a first resin 116. An "assembly" as described in this disclosure is a plurality of individual components that may be joined together to create a finished individual product. "Composite" as defined in this disclosure is material which is produced from two or more materials. Composites may include a plurality of carbon fiber strands that are permeated with a plastic resin. "Composite assembly" as defined in this disclosure is a plurality of composites or components that may be joined together to create a single product. For example, composite assembly 100 may include a plurality of composites wherein each composite is joined together to create a single product. In some embodiments, composite assembly 100 may refer to a composite laminate. "Composite laminate" as defined herein is a composite having multiple layers or laminae, wherein each lamina is a thin layer of a material or a composite material. First molded part 108 may include a molded part. "Molded part" as described in this disclosure refers to a component that was created through a molding process in which a resin was poured into a mold. In some embodiments, first molded part 108 may be cured such that resin is hardened creating a solid pliable or non-pliable material. In some embodiments, first molded part 108 may include an uncured part wherein molded part is not yet cured and is still in a liquid form. First molded part 108 includes a plurality of fibers that is partially infused with first resin 116. First plurality of fibers 112 may include plurality of fibers mentioned below. Plurality of fibers may include a plurality of fiber strands wherein the fibers are spooled into fiber strands. Plurality of fibers may include a carbon fiber material wherein the fibers are strands of carbon fiber. Plurality of fibers may further include other fibers used for reinforcement of a composite. For example, plurality of fibers may include glass fibers, aramid fibers or basalt fibers. Plurality of fibers may be placed in a parallel direction wherein the fibers are all facing in one direction and are substantially parallel to each other. In some embodiments, plurality of fibers may be placed in a perpendicular direction wherein the fibers interlaced at a 90-degree angle. First resin 116 includes a resin as described in this disclosure. "Resin" as described in this disclosure is a compound consisting of a non-crystalline or viscous liquid substance. Resin may be reacted with a curing agent or a hardener in order to create a solid material. In some embodiments, resin may include vinylester resins, epoxy resins or any other lightweight resins with durability suitable for aircraft.

With continued reference to FIG. 1, first molded part 108 is partially infused with resin. "Infused" as defined herein refers to the process in which a resin is poured into or onto a dry laminate in order to create a composite. For example, resin may be poured into or on top of first plurality of fibers 112 such that first plurality of fibers 112 is embedded within resin. "Partially infused" as described herein refers to the process wherein only a portion or a section of plurality of fibers is embedded or wetted by resin. The remaining area of plurality of fibers remains dry or uninfused. First molded part 108 may be cured wherein first molded part 108 is a solid material. In some embodiments, infusion of first molded part 108 may be uncured wherein first molded part 108 is a liquid that can continue to be molded and cured at a later time. In some embodiments, first assembly 104 may contain a first uninfused region located an edge of first assembly 152. "Uninfused region" as described in this disclosure refers to a portion of first assembly 104 wherein first plurality of fibers 112 is not infused with first resin 116. In some embodiments, uninfused region may refer to an end of first plurality of fibers 112 wherein the end is not infused with first resin 116. In some embodiments first uninfused region may include portion of first plurality of fibers 140. First uninfused region may be located at an edge of first assembly 152 such as a corner, along a vertical edge or along a horizontal edge of first assembly 152.

With continued reference to FIG. 1, With continued reference to FIG. 1, first molded part 108 may be partially infused with resin using a vacuum infusion process or any other molding process as described in this disclosure.

With continued reference to FIG. 1, composite assembly 100 further includes a second assembly 120 relative to the first assembly 104, second assembly 120 including a second molded part 124. Second molded part 124 comprises a second plurality of fibers 128 and is partially infused with a second resin 132. Second molded part 124 includes a molded part as described above. In some embodiments, second molded part 124 is substantially similar to first molded part 108. In some embodiments, second molded part 124 is different from first molded part 108 wherein second molded part 124 may take a different shape or size. Additionally, or alternatively, second plurality of fibers 128 includes the plurality of fibers as mentioned above. Second plurality of fibers 128 may be substantially similar to first plurality of fibers 112 wherein second plurality of fibers 128 contain a similar material or a similar orientation as first plurality of fibers 112. In some embodiments, second plurality of fibers 128 may contain a different material or orientation as first plurality of fibers 112. For example, second plurality of fibers 128 may contain a carbon fiber material wherein the fibers are orientated at a 45-degree angle and first plurality of fibers 112 contains a glass fiber material oriented at a negative 45-degree angle. Additionally, or alternatively, second resin 132 may contain a resin as described in this disclosure. In some embodiments second resin 132 is substantially similar to first resin 116. For example, second resin 132 may contain a resin such as an epoxy resin or a resin similar to that of first resin 116. In some embodiments, second resin 132 may contain a resin that is different from first resin 116. In some embodiments, second assembly 120 may contain a second uninfused region. Second uninfused region may be located in an area to similar to that of first uninfused region. In some embodiments, second uninfused region may be located at an edge 156 that may compliment first uninfused region. For example, second uninfused region may be located on a left side of second assembly 120 and first uninfused region may be located on a right side of first assembly 104 wherein first uninfused region and second uninfused region meet and can be joined at an edge. In some embodiments second uninfused region may contain portion of second plurality of fibers 144. In some embodiments, first uninfused region and second uninfused region may contain a coating, the coating configured to prevent infusion of a resin. "Coating" as described herein may refer to a coating of a portion of plurality of fibers or a covering of the portion of plurality of fibers. Coating may include a coating such as polyvinyl alcohol or denatured alcohol. Coating may further include covering first uninfused region and covering second uninfused region such that first resin 116 or second resin 132 does not come into contact with the portions.

With continued reference to FIG. 1, second assembly 120 may be oriented relative to first assembly 104 such that second assembly 120 may be adjacent to first assembly 104. In some embodiments, second assembly 120 is stacked upon first assembly 104 wherein a surface of second assembly 120 may be substantially adjacent to a surface of first assembly 104. In some embodiments, second assembly 120 may be oriented relative to first assembly 104 wherein an edge of second assembly 156 is substantially adjacent to an edge of first assembly 152.

With continued reference to FIG. 1, first uninfused region may be overlayed by second uninfused region and infused a third resin 148. First uninfused region may be overlayed such that first uninfused region is substantially adjacent to or touching second uninfused region. In some embodiments first uninfused region includes at least a portion of first plurality of fibers 140. Similarly, in some embodiments, second uninfused region includes at least a portion of second plurality of fibers 144. First uninfused region may be overlayed wherein first uninfused region rests atop second uninfused region. In some embodiments, first uninfused region may be overlayed such that first uninfused region substantially covers second uninfused region. In some embodiments, first uninfused region may be overlayed such that first uninfused region is woven with second uninfused region. In some embodiments, first uninfused region may contain a plurality of layers and second uninfused region may contain a plurality of layers, wherein each layer of first uninfused region is overlayed each layer of second uninfused region. In some embodiments, first uninfused region and second uninfused region may be stitched together. "Third resin" as described herein refers to a resin as described above. In some embodiments, third resin 148 may be a cured resin wherein third resin 148 is a solid material binding the at least a portion of first plurality of fibers 140 and at least a portion of second plurality of fibers 144. In some embodiments, third resin 148 may be an uncured resin wherein at least a portion of first plurality of fibers 140 and at least a portion of second plurality of fibers 144 are embedded into to a wet matrix.

With continued reference to FIG. 1, composite assembly 100 includes a joining region 136. Joining region 136 comprises at least a portion of first plurality of fibers 140 and at least a portion of second plurality of fibers 144. At least a portion of first plurality of fibers 140 and at least a portion of second plurality of fibers 144 are substantially adjacent and infused with the third resin 148. "Joining region 136" as defined in this disclosure is a section of composite assembly 100 wherein two or more components are joined. For example, joining region 136 may include a portion of first assembly 104 and a portion of second assembly 120. "At least a portion of first plurality of fibers 140" as described herein refers to a segment of first plurality of fibers 112 from a first end extending towards a second end. Portion may include a segment that is less than half of the total length of first plurality of fibers 112. Portion may also include a segment that is more than half the length of first plurality of fibers 112. At least a portion of first plurality of fibers 140 may further include first uninfused region as described above. Similarly, "At least a portion of second plurality of fibers" as described herein refers to a segment of the second plurality of fibers 128 from a first end extending towards a second end. Portion may include a portion that is less than half of the total length of the second plurality of fibers 128. Portion may also include a segment that is more than half the length of the second plurality of fibers 128. At least a portion of second plurality of fibers 144 may further include second uninfused region as described above. "Substantially adjacent" as defined herein is substantially next to or adjoined. At least a portion of first plurality of fibers 140 and at least a portion of second plurality of fibers 144 are substantially adjacent and infused with third resin 148 such that the fibers are embedded in a single resin matrix. "Matrix" as described in this disclosure is a constituent of a composite material that binds fibers and provides the composite a shape. In some embodiments, at least a portion of first plurality of fibers 140 and at least a portion of second plurality of fibers 144 may be interwoven. In some embodiments, at least a portion of first plurality of fibers 140 and at least a portion of second plurality of fibers 144 may be facing in a parallel direction. In some embodiments, at least a portion of first plurality of fibers 140 and at least a portion of second plurality of fibers 144 may be facing in a perpendicular direction. In some embodiments, at least a portion of first plurality of fibers 140 and at least a portion of second plurality of fibers 144 may be bound using stitching, an adhesive or through tying the fibers together. In some embodiments, at least a portion of first plurality of fibers 140 and at least a portion of second plurality of fibers 144 may be stitched together.

With continued reference to FIG. 1, joining region 136 may include a plurality of first layers. First assembly 104 includes plurality of first layers. "Plurality of first layers" as described herein refers to a plurality of components attached or stacked upon each other to create a single unified product. Plurality of first layers may include a composite laminate wherein each individual layer refers to a lamina of the composite laminate. Plurality of first layers may include a plurality of lamina wherein in each lamina contains substantially similar material properties. For example, plurality of first layers may include a plurality of lamina wherein each lamina is a composite having carbon fiber embedded within a resin matrix. In some embodiments, plurality of first layers contains multiple laminae where in each lamina includes first plurality of fibers 112 and first resin 116. In some embodiments, plurality of first layers may be oriented in the same direction such that first plurality of fibers 112 in a first lamina are oriented in a similar direction than first plurality of fibers 112 in a second lamina. A benefit to orienting lamina in a similar direction may be to increase structural strength of first assembly 104 in one specific direction. In some embodiments, plurality of first layers may be oriented in the different direction such that first plurality of fibers 112 in a first lamina are oriented in a different direction than first plurality of fibers 112 in a second lamina. For example, plurality of first layers may contain one lamina oriented at a 45-degree angle and another oriented at a 30-degree angle. A benefit to orienting plurality of first layers in multiple directions is to increase distribute structural strength over multiple direction of first assembly 104. In some embodiments, individual layers, or lamina of first plurality of first layers may be overlapped with individual layers or lamina of plurality of second layers. For example, a first layer of first assembly 104 may be oriented above a first layer of second assembly 120, then a second layer of first assembly 104 may be oriented above a second layer of second assembly 120 and the like. In some embodiments, the plurality of first layers me be overlapped in another sequence such as a first and second layer of first assembly 104 overlapped over a first and second layer of second assembly 120.

With continued reference to FIG. 1, overlap as used in this disclosure may include interleaving. Interleaving may include placing additional composites, resins, carbon finer materials and the like at joining region 136. Overlap may further include placing first assembly 104 on top of second assembly 120 resulting in a single interface between first assembly 104 and second assembly 120. Overlap may further include placing first assembly 104 on top of second assembly 120 wherein an entirety of first assembly 104 is stacked on top of second assembly 120. Overlap may further include overlapping a plurality of assemblies wherein an entirety of at least one of the plurality of assemblies, is placed above an entirety of at least another assembly. Overlapping may further include any overlapping in which a portion of first assembly 104 is above or substantially adjacent to a portion of second assembly 120. Overlaps may be by the entire layup from one assembly onto another resulting in a single interface between the assemblies. Alternatively or additionally, overlaps may be by individual plies, or a variable number of plies. For example, in some cases, a non-woven composite material that is comprised of four layers of unidirectional material may be treated as a unit, which may be referred to as a "stack." In some cases, a joint may include interleaved multiply stacks, where each multiply stack is unseparated. Alternatively or additionally, a joint may include interleaved individual plies, where each stack is separated in the joint.

With continued reference to FIG. 1, in some embodiments, composite assembly 100 may include a portion of an outer mold line of an aircraft. In some embodiments, aircraft may include a blended wing body aircraft. "Outer mold line" as described herein refers to an outer surface of a shell of an aircraft. Outer mold line may include an outer surface of a wing of an aircraft, an outer surface of a fuselage of an aircraft and any other outer surface as described in this disclosure. Composite assembly 100 may include a portion of outer mold line. A portion here may include a piece of a section of the outer surface such as only a main body, only a fuselage or only an undercarriage of an aircraft. In some embodiments, a portion of outer mold line may further include areas that require increase structural strength or areas that require decreased structural strength. A portion of outer mold line may further include areas in which a pliable material may be used. Additionally, or alternatively, a portion of outer mold line may include areas in which a non-pliable material may be needed. In some embodiments, composite assembly 100 may include an outer mold line surface of aircraft. In some embodiments, composite assembly 100 may include an outer mold line surface of aircraft wherein composite assembly 100 is a single unified and cured composite.

Figure 2:
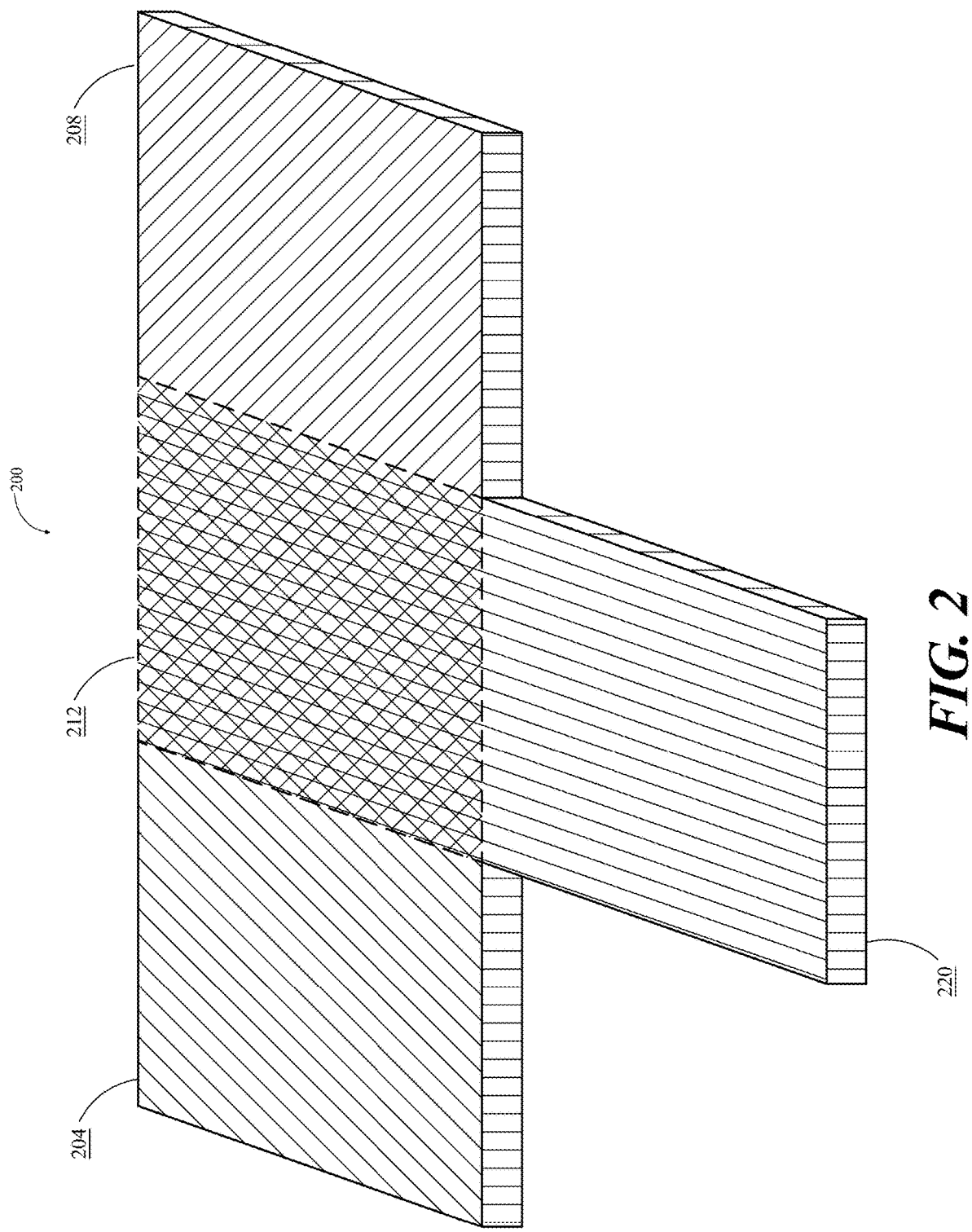
FIG. 2 is an isometric view of another exemplary embodiment of the composite assembly according to the subject disclosure.

Referring now to FIG. 2, an isometric view of another embodiment of a composite assembly 200 is illustrated. Composite assembly 200 includes a first assembly 204 as described in this disclosure. Composite assembly also includes a second assembly 208, and a joining region 212 as described in this disclosure. Joining region 212 may include a plurality of third layers. Plurality of third layers may belong to a third assembly 216 wherein the third assembly 216 contains similar properties to first assembly 204 and second assembly 208. Third assembly may include a molded part, a plurality of fibers, and a resin as described above. A plurality of first layers, a plurality of second layers and plurality of third layers may be overlapped similar to any overlapping as described in this disclosure. In some embodiments, individual layers of plurality of third layers is overlapped by the individual layers of the plurality of first layers and the individual layers of the plurality of third layers. In some embodiments, third assembly 216 is a structural element having out of plane depth wherein third assembly 216 is attached to first assembly 204 and second assembly 208 and cured.

With continued reference to FIG. 2, in some embodiments, joining region 212 may include more than two assemblies wherein at least one of the more than two assemblies contains a plurality of layers and wherein the more than two assemblies are overlapped with one another. Plurality of layers may be similar to plurality of first layers as described above. As a non-limiting example, joining region 212 may contain first assembly 204, second assembly 208, third assembly 216 and a fourth assembly. Continuing the example, first assembly 204 may contain plurality of first layers, second assembly 208 may contain plurality of second layers, third assembly 216 may contain plurality of third layers and fourth assembly may contain a plurality of fourth layers wherein plurality of fourth layers may be similar to plurality of first layers. More than two assembles may be overlapped as described above. It is to be understood that joining region 212 may contain a plurality of assemblies, wherein each assembly contains a plurality of layers and wherein plurality of assemblies are overlapped.

Figure 3:
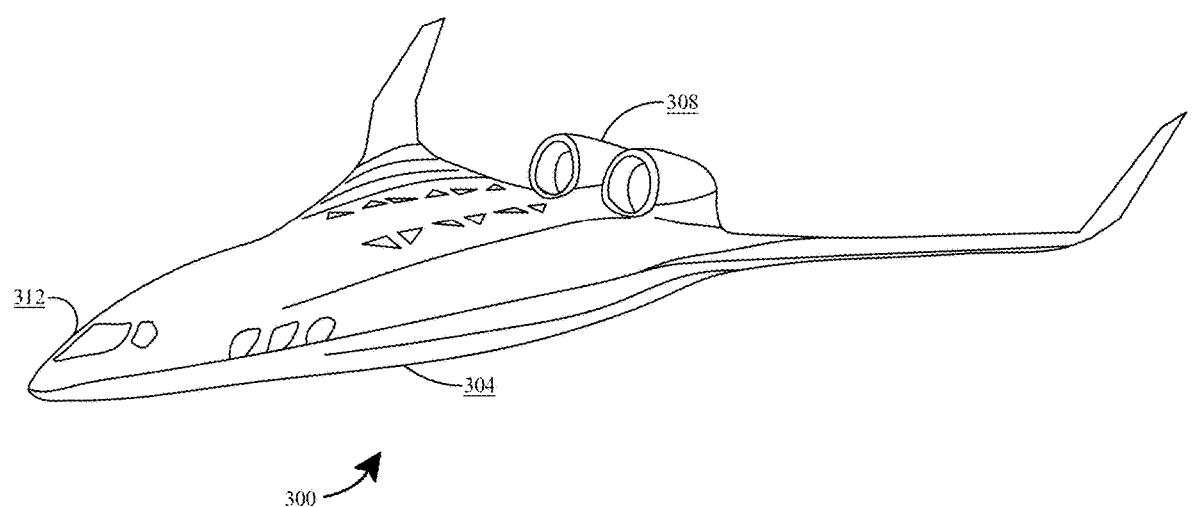
FIG. 3 is a schematic of an exemplary blended wing aircraft.

Referring to FIG. 3, an exemplary blended wing aircraft 300 is illustrated. Aircraft 300 may include a blended wing body 304. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 304 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 304 design may or may not be tailless. One potential advantage of a BWB 304 may be to reduce wetted area and any accompanying drag associated with a conventional wing-body junction. In some cases, a BWB 304 may also have a wide airfoil-shaped body, allowing entire aircraft to generate lift and thereby facilitate reduction in size and/or drag of wings. In some cases, a BWB 304 may be understood as a hybrid shape that resembles a flying wing, but also incorporates features from conventional aircraft. In some cases, this combination may offer several advantages over conventional tube-and-wing airframes. In some cases, a BWB airframe 304 may help to increase fuel economy and create larger payload (cargo or passenger) volumes within the BWB. BWB 304 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 3, BWB 304 of aircraft 300 may include a nose portion. A "nose portion," for the purposes of this disclosure, refers to any portion of aircraft 300 forward of the aircraft's fuselage 316. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 3, BWB 304 may include at least a structural component of aircraft 300. Structural components may provide physical stability during an entirety of an aircraft's 300 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 300 structure, they may be so named A, B, C, and so on named from nose to tail. Pillars, like any structural element, may be disposed a distance away from each other, along an exterior of aircraft 300 and BWB 304. Depending on manufacturing method of BWB 304, pillars may be integral to frame and skin, comprised entirely of internal framing, or alternatively, may be only integral to structural skin elements. Structural skin will be discussed in greater detail below.

With continued reference to FIG. 3, BWB 304 may include a plurality of materials, alone or in combination, in its construction. At least a BWB 304, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 304 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 304 may additionally or alternatively use wood or another suitably strong yet light material for an internal structure.

With continued reference to FIG. 3, aircraft 300 may include monocoque or semi-monocoque construction. BWB 304 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 3000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 3, BWB 304 may include at least a fuselage. A "fuselage," for the purposes of this disclosure, refers to a main body of an aircraft 300, or in other words, an entirety of the aircraft 300 except for nose, wings, empennage, nacelles, and control surfaces. In some cases, fuselage may contain an aircraft's payload. At least a fuselage may comprise structural components that physically support a shape and structure of an aircraft 300. Structural components may take a plurality of forms, alone or in combination with other types. Structural components vary depending on construction type of aircraft 300 and specifically, fuselage. A fuselage 313 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 3, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 300. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 300 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 3, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 3, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 3, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 3, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 3, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 304. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^3$) or Pascals (Pa). In semi-monocoque construction stressed skin bears part of aerodynamic loads and additionally imparts force on an underlying structure of stringers and formers.

With continued reference to FIG. 3, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 300 is in its level flight orientation or sitting on ground. A post may act similarly to stringer in that it is configured to support axial loads in compression due to a load being applied parallel to its axis due to, for example, a heavy object being placed on a floor of aircraft 300. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 3, aircraft 300 may include at least a flight component 308. A flight component 308 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 300 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 300. In some embodiments, at least a flight component 308 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 3, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 3, at least a flight component may be one or more devices configured to affect aircraft's 300 attitude. "Attitude", for the purposes of this disclosure, is the relative orientation of a body, in this case aircraft 300, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 300. A plurality of attitude datums may indicate one or more measurements relative to an aircraft's pitch, roll, yaw, or throttle compared to a relative starting point. One or more sensors may measure or detect an aircraft's 300 attitude and establish one or more attitude datums. An "attitude datum", for the purposes of this disclosure, refers to at least an element of data identifying an attitude of an aircraft 300.

With continued reference to FIG. 3, in some cases, aircraft 300 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 3, in some cases, aircraft 300 may include at least a pilot control. As used in this disclosure, a "pilot control," is an interface device that allows an operator, human or machine, to control a flight component of an aircraft. Pilot control may be communicatively connected to any other component presented in aircraft 300, the communicative connection may include redundant connections configured to safeguard against single-point failure. In some cases, a plurality of attitude datums may indicate a pilot's instruction to change heading and/or trim of an aircraft 300. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 300. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 308 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 3, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 308. At least a flight component 308 may include any propulsor as described herein. In embodiment, at least a flight component 308 may include an electric motor, a propeller, a jet engine, a paddle wheel, a rotor, turbine, or any other mechanism configured to manipulate a fluid medium to propel an aircraft as described herein. An embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 3, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 3, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 3, at least a flight component 308 may include wings, empennages, nacelles, control surfaces, fuselages, and landing gear, among others, to name a few. In embodiments, an empennage may be disposed at the aftmost point of an aircraft body 304. Empennage may comprise a tail of aircraft 300, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 300 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 300 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 304 aircraft 300 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 308 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 308 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 300. Such devices increase an effective aspect ratio of a wing without greatly increasing wingspan. Extending wingspan may lower lift-induced drag but would increase parasitic drag and would require boosting the strength and weight of the wing. As a result, according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 300 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 3, aircraft 300 may include an energy source. Energy source may include any device providing energy to at least a flight component 308, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode.

In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 3, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 304 of aircraft 300, for example without limitation within a wing portion 313 of blended wing body 308. Aviation fuels may include petroleum-based fuels, or petroleum and synthetic fuel blends, used to power aircraft 300. In some cases, aviation fuels may have more stringent requirements than fuels used for ground use, such as heating and road transport. Aviation fuels may contain additives to enhance or maintain properties important to fuel performance or handling. Fuel may be kerosene-abased (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 300. Liquid fuel may include Jet-A. Presently Jet-A powers modern commercial airliners and is a mix of extremely refined kerosene and burns at temperatures at or above 49° C. (130° F.). Kerosene-based fuel has a much higher flash point than gasoline-based fuel, meaning that it requires significantly higher temperature to ignite.

With continued reference to FIG. 3, modular aircraft 300 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 3, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 3 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 3, aircraft 300 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 3, aircraft 300 may include multiple flight component 308 sub-systems, each of which may have a separate energy source. For instance, and without limitation, one or more flight components 308 may have a dedicated energy source. Alternatively, or additionally, a plurality of energy sources may each provide power to two or more flight components 308, such as, without limitation, a "fore" energy source providing power to flight components located toward a front of an aircraft 300, while an "aft" energy source provides power to flight components located toward a rear of the aircraft 300. As a further non-limiting example, a flight component of group of flight components may be powered by a plurality of energy sources. For example, and without limitation, two or more energy sources may power one or more flight components; two energy sources may include, without limitation, at least a second energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 308. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 3, aircraft 300 may include a flight component 308 that includes at least a nacelle 308. For the purposes of this disclosure, a "nacelle" is a streamlined body housing, which is sized according to that which is houses, such as without limitation an engine, a fuel store, or a flight component. When attached by a pylon entirely outside an airframe 304 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 300 partially or wholly enveloped by an outer mold line of the aircraft 300. At least a nacelle may be designed to be streamlined. At least a nacelle may be asymmetrical about a plane comprising the longitudinal axis of the engine and the yaw axis of modular aircraft 300.

With continued reference to FIG. 3, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a second body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 3, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 3, in nonlimiting embodiments, at least a flight component 308 may include an airbreathing engine such as a jet engine, turbojet engine, turboshaft engine, ramjet engine, scramjet engine, hybrid propulsion system, turbofan engine, or the like. At least a flight component 308 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may includes heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 3, an aircraft 300 may include a flight controller. As used in this disclosure, a "flight controller" is a device that generates signals for controlling at least a flight component 308 of an aircraft 300. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 3, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a second location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 300 and/or computing device.

With continued reference to FIG. 3, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
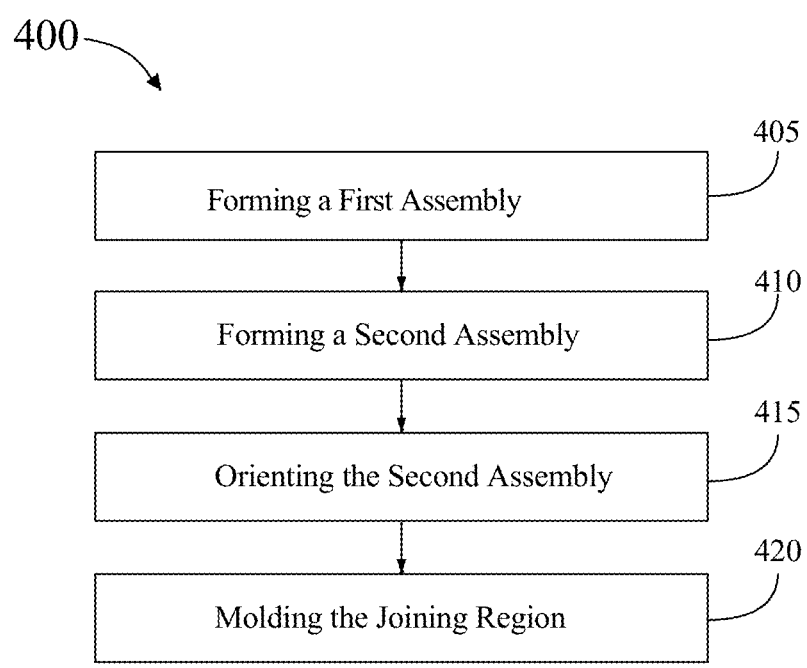
FIG. 4 is a block diagram of an exemplary method of manufacture of a composite assembly for a blended wing body aircraft.

Referring now to FIG. 4, a method 400 of manufacturing a composite assembly 100 for a blended wing body aircraft is illustrated. At step 405, method 400 includes forming a first assembly 104 having a first plurality of fibers 112. Forming first assembly 104 includes molding a first molded part 108, wherein molding first molded part 108 includes partially infusing a resin into a first mold. "Forming" as described herein may refer to assembly of first molded part 108. Forming may include creating a mold for first molded part 108. Forming may also include placing first plurality of fibers 112 into a mold. Forming may further include orientating first plurality of fibers 112 in a particular direction. For example, first plurality of fibers 112 may be oriented at a 45-degree angle relative to first assembly 104 and all parallel to each other. In another non-limiting example, first plurality of fibers 112 may be oriented at a zero-degree angle relative to first assembly 104 and placed perpendicular to each other such that first plurality of fibers 112 are interwoven. Forming may further include pouring a resin into a mold to create first molded part 108. In some embodiments, forming may further include coating a portion of first plurality of fibers 140, wherein the coating is configured to prevent infusion of a resin. Coating may cover a first uninfused region. Coating may further cover a second uninfused region. "Molding" as described herein refers to the formation of an object. In some embodiments, molding may include formation of an object using malleable material. Molding may include pouring a resin into a mold to create a part. Molding may further include pouring resin into a mold and curing the mold. Molding may include a Resin Transfer Molding. Resin Transfer Molding as described is a closed molding process wherein resin is injected into a mold having a dry composite, such as carbon fibers, and clamped together. Continuing, a vacuum is then applied to the mold to remove any air and ensure that the dry composite has been properly infused. In some embodiments, molding may include compression molding. Compression molding as described herein is process in which a molding material such as resin is placed into an open mold and compressed from an open end of the mold. In some embodiments, molding may include a Vacuum Infusion Process (VIP). Vacuum infusion process as described herein refers to a closed molding process in which resin is infused into a mold using a vacuum to draw the resin into the mold. VIP includes placing a dry composite such as carbon fibers into a mold and infusing the carbon fibers with a resin. In a vacuum infusion process, air pockets and any other voids are removed and resin is drawn into the mold. In a vacuum infusion process, the dry composite is first placed into a mold and the resin is drawn into a mold such that the resin takes the form of the mold. In a vacuum infusion process, the dry composite may be compacted using a vacuum before the resin is drawn in. A vacuum infusion process may be preferred in materials that require a higher concentration of dry composites or reinforcement material in comparison to the resin. In a vacuum infusion process voids may be minimized as air pockets are sucked out prior to the resin being drawn into the laminate. In some embodiments, molding include using a wet-layup method. A "wet layup" method as described in this disclosure is a method in which a carbon fiber material, such as plurality of fibers, or a reinforcement material is created by pouring a resin on top of a dry fabric such as carbon fiber. The resin may be mixed with a catalyst prior to pouring in order to create a solid material. The poured resin is rolled to remove pockets and dried to create a solid composite laminate. The composite laminate may be a pliable or non-pliable material. A wet layup may consist of multiple layers wherein each layer may comprise a similar or different material. In some embodiments, molding may include using a prepreg method. "Prepreg" method as described in this disclosure is a method in which a reinforcement material such as carbon fiber is pre-impregnated with resin prior to pouring. The resin is then poured above the reinforcement material and dried to create a composite. In some embodiments, blended body wing may be molded using an infusion process. In some embodiments, first plurality of include a carbon fiber material. This may be implemented, without limitation, as described above in reference to FIGS. 1-4.

With continued reference to FIG. 4 at step 405, "partially infusing" may include partially infusing the first plurality of fibers 112 wherein only portion of the first plurality of fibers 140 are embedded in a resin. In some embodiments, partially infusing may include an uncured resin wherein the uncured resin is still in a malleable or liquid form. In some embodiments, partially infusing may further include curing the resin in order to create a nonpliable product. In some embodiments partially infusing may include infusing only portion of the first plurality of fibers 140. Portion may include a first end in the direction of a second end or a second end in the direction of a first end and the like. Portion may further include half of a length of the first plurality of fibers 112. Portion may further include, at most half of the length of the first plurality of fibers 112. This may be implemented, without limitation, as described above in reference to FIGS. 1-4.

With continued reference to FIG. 4, at step 410 method 400 includes forming a second assembly 120 having a second plurality of fibers 128, wherein forming second assembly 120 includes molding a second molded part 124. Molding second molded part 124 comprises partially infusing a resin into a second mold. Step 410 further includes orienting a second assembly 120 relative to the first assembly 104 to create a joining region 146, wherein the joining region 146 comprises a first uninfused region of the first assembly 104 and a second uninfused region of the second assembly 120. Second assembly 120 may be formed similar to first assembly 104 as described above. Second assembly 120 may further be molded similar to first assembly 104 as described above. Second assembly 120 may further be oriented relative to first assembly 104 as described in this disclosure. In some embodiments, second assembly 120 may be oriented above first assembly 104 wherein a surface of second assembly 120 is substantially in contact with a surface of first assembly 104. In some embodiments, second assembly 120 may further be oriented relative to first assembly 104 such that second assembly 120 is placed next to first assembly 104 such that an edge of second assembly 156 120 is substantially near first assembly 104. In some embodiments, orienting second assembly 120 includes placing second assembly 120 parallel to first assembly 104. In some embodiments, orienting second assembly 120 relative to first assembly 104 may include orienting second assembly 120 such that first uninfused region and second uninfused region are substantially in contact. In some embodiments orienting second assembly 120 relative to first assembly 104 may include orienting first uninfused region to be attached to second uninfused region. In some embodiments, orientating second assembly 120 relative to first assembly 104 may include stitching second assembly 120 to first assembly 104. In some embodiments an edge of second assembly 156 may be stitched to an edge of first assembly 152. In some embodiments, a section of first plurality of fibers 112 may be stitched to a section of second plurality of fibers 128. This may be implemented, without limitation, as described above in reference to FIGS. 1-4.

With continued reference to FIG. 4, first uninfused region may include a section of first plurality of fibers 112. First uninfused region may further contain a dry laminate, wherein first uninfused region may contain a portion or section of first plurality of fibers 112. In some embodiments, first uninfused region may contain a section of first plurality of fibers 112 that is not wetted with a first resin 116 as described above. In some embodiments, first unused portion may contain a section in which a section of first plurality of fibers 140 is not wetted when first molded part 108 is molded. In some embodiments, first uninfused portion may include portion of first plurality of fibers 140. In some embodiments, first uninfused region may be located at an edge of first assembly 152. Edge may include a corner, a side, an end or the like. In some embodiments, second uninfused region may be located at an edge of second assembly 156. In some embodiments, first uninfused region includes a coating, the coating configured to prevent infusion of a resin. In some embodiments, second uninfused region includes a coating, the coating configured to prevent infusion of a resin. Coating may be applied through dipping, brushing, pouring and the like. Coating may include any include as described in this disclosure. In some embodiments, the method may further include removing a coating from first uninfused region and second uninfused region, wherein the coating is removed prior to infusing a resin into first uninfused region and second uninfused region. This may be implemented, without limitation, as described above in reference to FIGS. 1-4.

With continued reference to FIG. 4, at step 415 method 400 includes molding joining region 146, wherein molding joining region 146 includes infusing first uninfused region and second uninfused region with the resin. Infusing first uninfused region and second uninfused region may include removing a coating on first uninfused region and second uninfused region. Infusing first uninfused region and second uninfused region may further include placing adhering first uninfused region to second uninfused region. First uninfused region may be adhered using an epoxy, through a knot tying first uninfused region to second uninfused region, through an adhesive, through stitching and the like. Molding joining region 146 may further include attaching first assembly 104 to second assembly 120 wherein first assembly 104 is connected to second assembly 120 at an edge. Molding joining region 146 may further include attaching first assembly 104 to second assembly 120 wherein first uninfused region is connected to second uninfused region. Molding joining region 146 may further include creating a single unified product, wherein the single unified product includes first assembly 104 and second assembly 120. This may be implemented, without limitation, as described above in reference to FIGS. 1-4.

With continued reference to FIG. 4, in some embodiments, molding joining region 146 includes placing the first uninfused region and the second uninfused region into a vacuum bag, sealing the vacuum bag with a vacuum device, and drawing a resin into the vacuum bag, the resin infusing the first uninfused region and the second uninfused region. Placing first uninfused region and second uninfused region into a vacuum bag may further include selecting a joining region 146 mold and placing first uninfused region and second uninfused region into the mold. In some embodiments, joining region 146 mold is placed into a vacuum bag. Sealing vacuum bad with vacuum device may further include preparing a feed line wherein the feed line is configured to push a resin into vacuum bag. Sealing vacuum bag with vacuum device may further include preparing a vacuum line wherein vacuum line is configured to remove air from vacuum bag. Sealing vacuum bag with vacuum device may further include blocking feed line. Sealing vacuum bag with vacuum device may further include drawing air from vacuum bag using vacuum device. Drawing a resin into vacuum bag may further include opening feed line to allow resin to pass through. Drawing a resin into vacuum bag may further include pulling resin into vacuum bag using pressure. Drawing a resin into vacuum bag may further include selecting a resin trap, wherein the resin trap is configured to prevent a resin from traveling into vacuum line. Resin may include an uncured resin wherein the resin is in a liquid form. Resin may further include a resin mixture containing a resin and a curing agent wherein the resin mixture has not yet cured, resin may be drawn to vacuum bag prior to curing such that resin may be cured within vacuum bag. In some embodiments, molding joining region 146 may further include removing vacuum bag and removing joining region 146 mold. This may be implemented, without limitation, as described above in reference to FIGS. 1-4.

With Continued reference to FIG. 4, first assembly 104 may include a plurality of first layers wherein each layer includes a plurality of fibers. Additionally, or alternatively second assembly 120 may include a plurality of second layers wherein each layers includes a plurality of fibers. Molding joining region 146 may further include overlapping plurality of first layers of first assembly 104 with plurality of second layers of second assembly 120. Overlapping may include placing a first layer of plurality of first layers, above and substantially in contact with a first layer of plurality of second layers. Overlapping may further include placing a second layer of plurality of second layers above first layer of plurality of first layers and the like. Overlapping may further include stitching or adhering first layer of plurality of first layers to first layer of plurality of second layers. Overlapping may further include an "ABABABAB" configuration wherein "A" represents an individual layer of plurality of first layers and "B" represents an individual layer of plurality of second layers. In some embodiments, molding rejoin further includes overlapping a plurality of third layers of a third assembly with a plurality of first layers of the first assembly 104 and the plurality of second layers of the second assembly 120. Overlapping may include an "ABCABCABC" configuration wherein "A" represents an individual layer of plurality of first layers, "B" represents an individual layer of plurality of second layers, and "C" represents an individual layer of plurality of third layers. In some embodiments, overlapping may further include an "ABCDABCDABCD" configuration or the like wherein "A" represents an individual layer of plurality of first layers, "B" represents an individual layer of plurality of second layers, "C" represents an individual layer of plurality of third layers, and "D represents an additional reinforcement material. In some embodiments, molding the joining region further comprises, overlapping more than two assemblies wherein at least one of the more than two assemblies include a plurality of layers. In some embodiments, overlapping may further include stitching through a depth of joining region 146. This may be implemented, without limitation, as described above in reference to FIGS. 1-4.

With continued reference to FIG. 4, at step 420, method 400 includes curing joining region 146 to create a composite assembly 100. Curing may include mixing resin with a curing agent, wherein curing agent is configured to cure resin and create a solid material. In some embodiments, curing may include applying a temperature to joining region 146 wherein a heating gun, curing oven, heating blanket or any other heating device may be used to heat and cure the resin. In some embodiments, curing joining region 146 includes applying a heat uniformly to a surface of joining region 146 to create a composite assembly 100. In some embodiments, curing joining rejoin may further include curing first assembly 104 and curing second assembly 120.

With continued reference to FIG. 4, in some embodiments, composite assembly 100 includes a portion of an outer mold line surface of an aircraft. A portion of an outer mold line surface of an aircraft may include, a panel, a window, a transition, a wing, or any other outer surface of aircraft. In some embodiments, outer mold line surface of an aircraft includes a plurality of composite assemblies wherein the plurality of composite assemblies are attached together to create a single unified product. This may be implemented, without limitation, as described above in reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
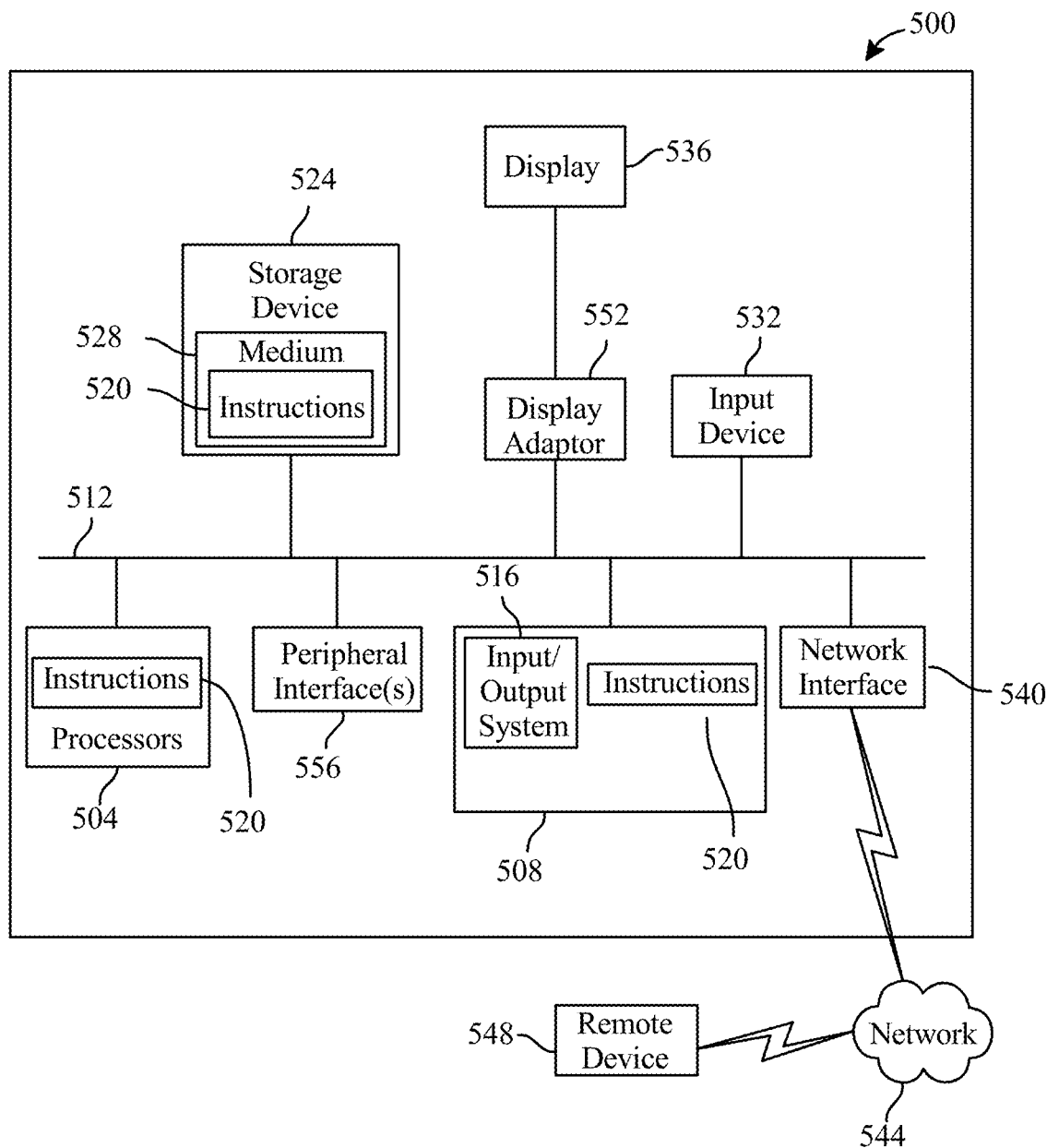
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1395 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 550. A network interface device, such as network interface device 550, may be utilized for connecting computer system 500 to one or more of a variety of networks, such as network 555, and one or more remote devices 558 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 555, may employ a wired and/or a wireless mode of communication. In general, any network topology may be used. Information (e.g., data, software 520, etc.) may be communicated to and/or from computer system 500 via network interface device 550.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A composite assembly for a blended wing body aircraft, the composite assembly comprising:
    a first portion of an outer mold line of the blended wing body aircraft comprising a first assembly, wherein the first assembly comprises a first molded part, wherein the first molded part comprises a first plurality of fibers, wherein the first molded part is partially infused with a first resin;
    a second portion of the outer mold line of the blended wing body aircraft comprising a second assembly, wherein the second assembly is oriented relative to the first assembly, the second assembly comprising a second molded part, wherein the second molded part comprises a second plurality of fibers, wherein the second molded part is partially infused with a second resin; and
    a joining region comprising at least a portion of the first plurality of fibers and at least a portion of the second plurality of fibers embedded within a single resin matrix having a thickness substantially similar to a thickness of the first assembly and a thickness of the second assembly, wherein the at least a portion of the first plurality of fibers and the at least a portion of the second plurality of fibers are substantially adjacent and infused with a third resin once the at least a portion of the first plurality of fibers and the at least a portion of the second plurality of fibers are positioned substantially adjacent to each other within the single resin matrix, wherein the at least a portion of the first plurality of fibers is oriented in a different direction than the at least a portion of the second plurality of fibers.

2. The composite assembly of claim 1, wherein the first plurality of fibers comprises a carbon fiber material.

3. The composite assembly of claim 1, wherein the first assembly further comprises a first uninfused region located at an edge of the first assembly and the second assembly further comprises a second uninfused region located at an edge of the second assembly.

4. The composite assembly of claim 3, the first uninfused region overlayed by the second uninfused region and infused with the third resin.

5. The composite assembly of claim 3, wherein the first uninfused region and the second uninfused region comprise a coating, the coating configured to prevent infusion of a resin.

6. The composite assembly of claim 3, wherein the first uninfused region and the second uninfused region are stitched together.

7. The composite assembly of claim 1, wherein the at least a portion of the first plurality of fibers and the at least a portion of the second plurality of fibers are stitched together.

8. The composite assembly of claim 1, wherein the joining region comprises a plurality of first layers of the first assembly and a plurality of second layers of the second assembly, wherein individual layers of the plurality of first layers are overlapped by individual layers of the plurality of second layers.

9. The composite assembly of claim 1, wherein the joining region comprises more than two assemblies, wherein at least one of the more than two assemblies comprises a plurality of layers, and wherein the more than two assemblies are overlapped with one another.

* * * * *